UNITED STATES PATENT OFFICE.

CHARLES H. SLICER, OF BALTIMORE, MARYLAND.

PRODUCING ASPHALTIC COMPOSITION POWDER FOR ROADWAYS.

SPECIFICATION forming part of Letters Patent No. 514,045, dated February 6, 1894.

Application filed January 28, 1893. Serial No. 460,063. (No specimens.)

*To all whom it may concern:*

Be it known that I, CHARLES H. SLICER, a citizen of the United States, and a resident of the city of Baltimore, in the State of Maryland, have invented certain new and useful Improvements in Producing Asphaltic Composition Powder for Roadways, of which the following is a specification.

My invention relates to an improved asphaltic composition powder for surfacing roadways, paving streets and like purposes; and my said invention consists in the process and in the product thereof, whereby an asphaltic carbonate of lime rock composition is produced, whose constituents, qualities and conditions shall, when desired, be substantially identical with those of the natural asphaltic carbonate of lime rock powder, commonly known as "Neufchâtel carbonate of lime rock powder," and at a cost so greatly less than that of this natural rock powder, as to admit of its general use for paving and surfacing purposes.

For many years it has been well known that for surfacing streets, roadways and the like, there has not been in use or put before the public, anything in durability and other desirable qualities, of near resemblance to the Neufchâtel rock powder. This natural product is peculiarly constituted in having the condition, quantity and quality of its carbonate and asphalt so fixed or determined and evenly commingled or diffused as to admit of the rock being disintegrated and reduced to powder by the application of heat or by mechanical means, such as disintegrating rollers, for separating the particles to a fine, clean dry powder, either in a hot or cold condition. This operation is such as to separate the grains, which are only bound together in the rock by the asphalt, into powder, without crushing the grains, and leaving the natural coating of asphalt upon the grains intact. This powder when in a hot state can be sifted through a sieve having a mesh of thirty or forty to the inch, or otherwise spread upon the roadway, &c., when properly prepared to receive it, and being then tamped, becomes a solid more durable than granite for street and road wear. Hence the Neufchâtel powder has set the standard of excellence by which all other asphaltic materials, for like purposes, are or may be measured or determined.

In order to give a full description of my improved asphaltic carbonate of lime rock powder and process of producing it, it is necessary to state here the kind, conditions and proportions of the materials composing the natural Neufchâtel rock powder, as disclosed by analysis by different authorities from the year 1837 to the present time. These authorities differ as to the exact quantity of asphalt and carbonate of lime contained in the natural powder or rock, but all agree in the fixing of the quantity of asphalt anywhere from eight to twelve per centum of its weight, and the carbonate of lime is given as eighty-five to ninety-two per cent. and moisture, silica, &c., as five per centum. Fully fifty per centum of the lime powder is of exceeding fineness, readily passing a sieve having a hundred mesh to the inch, while the balance will pass through a mesh of respectively sixty, forty and thirty to the inch. The condition of the asphalt when separated from the carbonate is semi-fluid or plastic. The great durability and wearing qualities of the Neufchâtel powder when in use is almost if not wholly due to the extremely fine comminution of over fifty per centum of its lime carbonate. This means nearly five times the weight of the asphalt is flour carbonate, the fine being generally in excess of the coarser particles of the carbonate. This should always be the case in making asphalt carbonate material where good quality of roadway material is required. It is by following the conditions and facts shown in the natural Neufchâtel rock that I am enabled to produce an asphaltic carbonate of lime rock powder substantially the same as the Neufchâtel by the process which I have discovered and which I will now state.

I take pure asphalt, or that of eighty-eight to ninety-five per centum purity. I prefer it in a natural plastic state, such as can be readily drawn by handling at a temperature of 60° Fahrenheit into threads or ribbons; but if the asphalt be not naturally in a plastic or semi plastic condition for use, I bring it to this plastic condition by the addition and incorporation by heat, of heavy gravity natural petroleum oil, as now commonly practiced by the trade to produce asphaltic cement commonly used in the trade; and the foregoing refers to the state of the art as now practiced in its best and most durable form. I take one part by weight of this plastic asphalt and add to it about fifty per centum of its weight of benzine, gasoline, or like solvent, or sufficient solvent to bring it to the proper fluid condition. By this means the asphalt can be readily reduced to a cream like fluid. When this is accomplished add and stir into the asphalt fluid about nine parts by weight of carbonate of lime rock powder in a condition of comminution as follows: Take about fifty per centum of the nine parts, by weight, that is to say, about four and a half parts to five, which shall pass readily through a sieve having a mesh of one hundred to the inch, while the balance of the nine parts shall pass respectively in about equal portions through a sixty, forty and thirty sieve. This large quantity of carbonate of lime flour and powder will very readily and quickly mix with the asphalt, each and every particle of the carbonate of lime becoming thoroughly and uniformly coated. It should be noted that as little of the benzine or solvent should be used as may be found practicable in bringing about the perfect and uniform coating of the particles of carbonate, just enough to leave the powder as little moist as possible after the mixing. This is for the reason that the solvent serves no other purpose than to allow the ready and uniform and proper degree of coating of this large quantity of carbonate of lime powder with the asphalt, as the solvent must be removed from the asphaltic lime powder before the powder is ready for use, and therefore, the less to remove the better.

The next and most important step in my process is the heating of the asphaltic lime rock mixture in order to fuse and cement by heat the asphaltic coating that is upon the particles of lime rock powder. This fusion of the asphalt by heat is necessary after the use of the solvent, since the evaporation of and the passing off of the solvent from the asphalt coating upon the particles of carbonate of lime, leaves the coating porous, or as it were, in the condition of impalpable powder. Hence the application of heat to fuse the asphalt back to its full cementing, adhesive tenacity and toughness around the particles of powder. But it will be understood that the mixing of the asphalt and powder to effect this porous coating of the particles of the powder, is done by the solvent at the same time and in the same vessel in which the coating of the powder is done and before any heat is used, and this is the distinctive novelty of my process for producing the powder which I have described. In fact so far as I know and can find carbonate of lime powder has never been coated with asphaltum in mixing the two materials with a solvent in the operation of producing carbonate of lime powder. The solvent can be driven off in various ways; or it may be allowed to pass off by evaporation. A rapid way to get rid of it is to vaporize the benzine by an air blast; but the most practicable and economical method is to drive out and off the moisture of the solvent by heat. This method gives the advantage of continuing the heat after the evaporation of the solvent to bring about the fusion of the asphalt coating around the particles of carbonate. The heat for this operation may be from 200° to 250° Fahrenheit, which leaves no danger of impairing the quality of the asphalt or lime carbonate in the mixture.

In treating asphalt for the mixture for road purposes solely by heat as usually practiced, great heat is required and results many times in impairing and often burning and even ruining the quality of the material. Another reason for applying heat for both driving off the solvent and for fusing the asphalt at the same time, is, that it gives the advantage of collecting and condensing the vaporized solvent by means of a still worm or other suitable condensing device, thus recovering the solvent for use over again. This recovery of the solvent for use again adds greatly to the economy of producing the asphaltic carbonate lime powder.

It must be understood that the heating of the powder for fusing the asphalt that is around the particles of carbonate, may be done at any time, that is to say after the mixing of the fluid asphalt and carbonate is accomplished, as I have before stated, or after the solvent has passed off by natural evaporation, or has been driven off by air blast; or the heating of the material may be put off and effected at the time of using. This heating, however, for laying the material is sufficient to bring about the necessary fusion of the asphaltic coating around the particles as heretofore stated. If the heating for laying the material is done without a previous heating for the specific purpose of effecting the evaporation and fusion alone, then such heating is within the spirit of my invention.

The material when used either with solvent present or with solvent passed out without heating the material for fusing for laying, is but poor stuff for roadway, street and like purposes.

The following is a simple method of mixing and producing my asphaltic carbonate rock powder: Take the proper proportion of powdered carbonate of lime rock and place it in a suitable metal vessel. Then take the proper quantity of asphalt made fluid by solvent and pour into the vessel having the carbonate of lime powder. Then stir the mixture with a paddle or other like device by which the mixing or coating of the particles of carbonate with asphalt is easily and readily accomplished. Heat is then applied under the vessel to bring about the fusion of the asphalt upon the particles, which at the same time drives off the solvent. This driving off the solvent and fusing the asphalt is accomplished very rapidly, particularly if the powder is stirred well during the heating. When this operation is complete, is readily determined by examining the powder, which will be found free of any solvent moisture, and granular. This product is carbonate of lime asphalt powder, and while yet hot is now ready for use, and by sifting it through a sieve or otherwise spreading the powder on the surface of the roadway or street to the proper thickness and tamping it with hot tamps, or rolling, it is brought to a solid surface and when cold becomes hard and will stand attrition from hard traffic longer than stone. In a word the operation of using the material is the same as that well known and practiced in the use of Neufchâtel powder.

Instead of using the powder at once as herein stated, it may be allowed to cool and when cool, stored in bulk, or in bags for future use, transportation and sale. It improves in quality by age and to use this stored material, it is only necessary to heat the powder to 200° or 250° Fahrenheit in any suitable revolving cylinder.

Another quality of this asphaltic carbonate of lime rock powder as produced by my process, is that after it has been used on streets for years, or elsewhere, it, like the Neufchâtel powder, can be taken up and again reduced to powder by heat and again relaid without the addition of new material of any kind, with equal if not better results than when first laid.

I do not confine myself to the use of pure asphalt or that of eighty-five or ninety per centum pure, as herein mentioned, as I may use Trinidad, Cuban or other like asphalt; but as these last mentioned asphalts, when sold, even as being refined, contain a very large per centage of almost impalpable inert matter not soluble or reducible to fluid, either by heat or by benzine, or the like, they would, of course, coat greatly less proportion of flour or powdered carbonate of lime rock to a given quantity of these asphalts, in producing asphaltic carbonate lime powder; and of course, these friable asphalts must be brought to a plastic state by the use of oil as herein stated, before they are used for coating the carbonate powder by my method. In fact, any of the natural asphalts, whether fluid or semi-fluid, as well as the solid and hard, can be used for making the asphaltic carbonate powder by following my process carefully. Nor do I confine myself by my process to making only an asphaltic carbonate powder of the very high grade quality of the Neufchâtel powder, as it is obvious that for many purposes my powder is of a finer and better quality and of greater cost than necessary. Hence by using the carbonate of lime powder to be coated of a grade less particularly fine, the same quality of asphalt will coat perfectly and readily a greater quantity of carbonate, ten or even twelve parts to one, instead of nine parts to one, as before mentioned, and still give an asphaltic carbonate of lime powder not equaled by any roadway or street material on the market except the Neufchâtel, and at a lower cost than that containing nine parts of finer carbonate, before mentioned.

It will be understood that carbonate of lime powder and sand, or sand alone, or other finely comminuted stone or like material can be used for being coated with asphalt for making a roadway, or paving material by my process and these come within the scope of my invention, but the lime powder for coating with asphalt will in the end prove of the greater economy.

A very desirable condition in which to use the carbonate of lime for being coated, as herein set forth, instead of having it of various degrees of coarseness above sixty mesh sieve, is to have the carbonate powder all pass readily a sixty mesh sieve. This gives a fine powder running up in fineness to and passing a hundred mesh, and while this gives a splendid asphaltic carbonate powder, it is more readily and economically worked than following the conditions of the natural powder as regards the variation of sizes of the particles of carbonate.

In the mixing and coating of the granules of carbonate of lime-rock with the fluid asphalt, which is done before heating the carbonate should be continued to be added until the mixture when put under heat should be freely and clearly granular and remaining almost freely granular when cold. It will be understood that in this granular condition there should be enough and perfect coating to bring about perfect adhesion of the particles of powder when hot and being tamped. This asphaltic carbonate of lime material as a product for use in surfacing roadways, streets and the like is distinguishable from mastic and other products on the market by reason of being in clean powder form and ready for heating, sifting and spreading.

It will be understood that for heating the powder for the purposes stated the heat may be applied to the mixing vessels; and for the recovery of the vapors of the solvent an ordinary still-worm may be used with the mixing vessel and as such appliances are well known their illustration is deemed unnecessary.

I claim as my invention—

1. The process herein described, of producing asphaltic carbonate of lime powder for roadways and other purposes, which consists in mixing the carbonate of lime rock powder together with asphalt rendered fluid by means of a solvent, removing the solvent and subjecting the mixture to heat to solidify and increase the adhesive qualities of the asphalt upon the powder particles, substantially as described.

2. The process herein described, of producing asphaltic carbonate of lime powder for roadways and the like, which consists in mixing carbonate of lime rock powder together with asphalt by means of a solvent, removing the solvent and heating the mixture to fuse and cement the asphalt coating around and upon the powder particles, the fine particles of carbonate of lime exceeding in weight the coarser particles for the purpose stated.

3. The process herein described, of producing asphaltic powder composition for roadways and the like, which consists in reducing the asphalt to a fluid condition by the use of a solvent, mixing therewith carbonate of lime powder with the addition of sand or other stone powder, removing the solvent and subjecting the mixture to heat to fuse and cement the asphalt coating around and upon the powder particles substantially as described.

In testimony whereof I have hereunto signed this specification in the presence of two subscribing witnesses.

CHARLES H. SLICER.

Witnesses:
N. CURTIS LAMMOND,
WOODBURY LOWERY.